United States Patent
Levin et al.

(10) Patent No.: US 10,599,833 B2
(45) Date of Patent: Mar. 24, 2020

(54) NETWORKING-BASED PROFILING OF CONTAINERS AND SECURITY ENFORCEMENT

(71) Applicant: Twistlock, Ltd., Herzliya (IL)

(72) Inventors: Liron Levin, Herzliya (IL); Dima Stopel, Herzliya (IL); Eran Yanay, Tel-Aviv (IL)

(73) Assignee: TWISTLOCK, LTD., Herzliya (IL)

( * ) Notice: Subject to any disclaimer, the term of this patent is extended or adjusted under 35 U.S.C. 154(b) by 195 days.

(21) Appl. No.: 15/858,336

(22) Filed: Dec. 29, 2017

(65) Prior Publication Data
US 2018/0144123 A1 May 24, 2018

Related U.S. Application Data

(63) Continuation-in-part of application No. 15/397,230, filed on Jan. 3, 2017, which is a continuation of application No. 15/278,700, filed on Sep. 28, 2016, and a continuation-in-part of application No. 15/292,915, filed on Oct. 13, 2016, now Pat. No. 10,223,534.

(60) Provisional application No. 62/274,420, filed on Jan. 4, 2016, provisional application No. 62/274,798, filed on Jan. 5, 2016, provisional application No. 62/235,644, filed on Oct. 1, 2015, provisional
(Continued)

(51) Int. Cl.
*H04L 29/06* (2006.01)
*G06F 21/52* (2013.01)
*G06F 21/55* (2013.01)

(52) U.S. Cl.
CPC ............ *G06F 21/52* (2013.01); *G06F 21/554* (2013.01); *G06F 2221/033* (2013.01); *H04L 63/1433* (2013.01)

(58) Field of Classification Search
None
See application file for complete search history.

(56) References Cited

U.S. PATENT DOCUMENTS 6,490,620 B1 12/2002 Ditmer et al.
6,502,102 B1 12/2002 Haswell et al.
(Continued)

OTHER PUBLICATIONS

Zhauniarovich, Yury et al. Moses: Supporting and Enforcing Security Profiles on Smartphones. IEEE Transactions on Dependable and Secure Computing, vol. 11, Issue: 3. https://ieeexplore.ieee.org/stamp/stamp.jsp?tp=&arnumber=6714498 (Year: 2014).*
(Continued)

*Primary Examiner* — Jeremiah L Avery
(74) *Attorney, Agent, or Firm* — M&B IP Analysts, LLC

(57) ABSTRACT

A system and method for securing execution of software containers using security profiles. The method includes receiving an event indicating that a container image requires profiling, wherein the container image includes resources utilized to execute a corresponding application container; generating a security profile for the container image when the event is received, wherein the generated security profile indicates at least networking ports that are allowed for at least one of: access to the application container, and access by the application container; monitoring an operation of a runtime execution of the application container; and detecting a violation of the security profile based on the monitored operation.

20 Claims, 6 Drawing Sheets

Related U.S. Application Data application No. 62/235,641, filed on Oct. 1, 2015, provisional application No. 62/241,812, filed on Oct. 15, 2015.

(56) References Cited

U.S. PATENT DOCUMENTS

| | | | |
|---|---|---|---|
| 6,523,027 | B1 | 2/2003 | Underwood |
| 6,704,873 | B1 | 3/2004 | Underwood |
| 6,732,162 | B1* | 5/2004 | Wood .............. H04L 29/06027 709/219 |
| 7,100,195 | B1 | 8/2006 | Underwood |
| 7,103,740 | B1 | 9/2006 | Colgrove et al. |
| 7,577,848 | B2 | 8/2009 | Schwartz et al. |
| 7,596,227 | B2* | 9/2009 | Illowsky .............. G06F 1/3203 380/277 |
| 7,640,235 | B2 | 12/2009 | Shulman et al. |
| 7,698,741 | B2 | 4/2010 | Marinescu et al. |
| 7,743,420 | B2 | 6/2010 | Shulman et al. |
| 7,752,662 | B2 | 7/2010 | Shulman et al. |
| 7,752,669 | B2 | 7/2010 | Palliyil et al. |
| 7,779,468 | B1 | 8/2010 | Magdych et al. |
| 7,861,303 | B2 | 12/2010 | Kouznetsov et al. |
| 7,882,542 | B2 | 2/2011 | Neystadt et al. |
| 8,024,804 | B2 | 9/2011 | Shulman et al. |
| 8,051,484 | B2 | 11/2011 | Shulman et al. |
| 8,056,141 | B2 | 11/2011 | Shulman et al. |
| 8,108,933 | B2 | 1/2012 | Mahaffey |
| 8,135,948 | B2 | 3/2012 | Shulman et al. |
| 8,181,246 | B2 | 5/2012 | Shulman et al. |
| 8,302,192 | B1 | 10/2012 | Cnudde et al. |
| 8,316,237 | B1* | 11/2012 | Felsher ................ H04L 9/0825 380/282 |
| 8,510,571 | B1 | 8/2013 | Chang et al. |
| 8,621,613 | B1 | 12/2013 | McClintock et al. |
| 8,639,625 | B1 | 1/2014 | Ginter et al. |
| 8,677,472 | B1 | 3/2014 | Dotan et al. |
| 8,806,625 | B1 | 8/2014 | Berger |
| 8,966,629 | B2 | 2/2015 | Sallam |
| 9,003,141 | B2 | 4/2015 | Nielsen et al. |
| 9,098,333 | B1* | 8/2015 | Obrecht .................... G06F 9/50 |
| 9,203,862 | B1 | 12/2015 | Kashyap et al. |
| 9,223,966 | B1 | 12/2015 | Satish et al. |
| 9,256,467 | B1 | 2/2016 | Singh et al. |
| 9,355,248 | B1 | 5/2016 | Wiest et al. |
| 9,401,922 | B1 | 7/2016 | Walters |
| 9,594,590 | B2 | 3/2017 | Hsu |
| 9,904,781 | B2 | 2/2018 | Martini et al. |
| 9,928,379 | B1 | 3/2018 | Hoffer |
| 10,223,534 | B2 | 3/2019 | Stopel et al. |
| 2001/0007131 | A1 | 7/2001 | Galasso et al. |
| 2003/0014629 | A1 | 1/2003 | Zuccherato |
| 2003/0079145 | A1 | 4/2003 | Kouznetsov et al. |
| 2003/0120593 | A1 | 6/2003 | Bansal et al. |
| 2003/0229801 | A1 | 12/2003 | Kouznetsov et al. |
| 2003/0233566 | A1 | 12/2003 | Kouznetsov et al. |
| 2003/0233574 | A1 | 12/2003 | Kouznetsov et al. |
| 2004/0133793 | A1 | 7/2004 | Ginter et al. |
| 2005/0120054 | A1 | 6/2005 | Shulman et al. |
| 2005/0177715 | A1 | 8/2005 | Somin et al. |
| 2006/0075494 | A1 | 4/2006 | Bertman et al. |
| 2006/0230451 | A1 | 10/2006 | Kramer et al. |
| 2006/0282664 | A1 | 12/2006 | Zhao |
| 2006/0288420 | A1 | 12/2006 | Mantripragada et al. |
| 2007/0112714 | A1 | 5/2007 | Fairweather |
| 2007/0130621 | A1 | 6/2007 | Marinescu et al. |
| 2007/0136282 | A1 | 6/2007 | Takashima |
| 2007/0174630 | A1 | 7/2007 | Shannon et al. |
| 2007/0240218 | A1 | 10/2007 | Tuvell et al. |
| 2007/0240220 | A1 | 10/2007 | Tuvell et al. |
| 2007/0240221 | A1 | 10/2007 | Tuvell et al. |
| 2007/0240222 | A1 | 10/2007 | Tuvell et al. |
| 2008/0086773 | A1 | 4/2008 | Tuvell et al. |
| 2008/0168135 | A1 | 7/2008 | Redlich et al. |
| 2008/0177994 | A1 | 7/2008 | Mayer |
| 2008/0196104 | A1 | 8/2008 | Tuvell et al. |
| 2008/0256636 | A1 | 10/2008 | Gassoway |
| 2009/0144823 | A1 | 6/2009 | Lamastra et al. |
| 2009/0319796 | A1 | 12/2009 | Kim et al. |
| 2010/0011029 | A1 | 1/2010 | Niemela |
| 2011/0116637 | A1 | 5/2011 | Schiefelbein |
| 2011/0179484 | A1 | 7/2011 | Tuvell et al. |
| 2011/0258701 | A1 | 10/2011 | Cruz et al. |
| 2011/0314542 | A1 | 12/2011 | Viswanathan et al. |
| 2011/0314548 | A1 | 12/2011 | Yoo |
| 2012/0008529 | A1 | 1/2012 | Averbuch et al. |
| 2012/0023584 | A1 | 1/2012 | Yoo |
| 2012/0036572 | A1 | 2/2012 | Yoo |
| 2012/0042375 | A1 | 2/2012 | Yoo |
| 2012/0222123 | A1 | 8/2012 | Williams et al. |
| 2013/0073388 | A1 | 3/2013 | Heath |
| 2014/0059226 | A1 | 2/2014 | Messerli et al. |
| 2014/0181894 | A1 | 6/2014 | Bokern et al. |
| 2014/0237550 | A1 | 8/2014 | Anderson et al. |
| 2014/0283071 | A1 | 9/2014 | Spikes |
| 2014/0337234 | A1 | 11/2014 | Tang et al. |
| 2015/0156183 | A1 | 6/2015 | Beyer et al. |
| 2015/0271139 | A1 | 9/2015 | Lukacs et al. |
| 2015/0332043 | A1 | 11/2015 | Russello |
| 2016/0323315 | A1 | 11/2016 | Hathaway et al. |
| 2017/0063557 | A1 | 3/2017 | Chalmandrier-Perna |
| 2017/0068676 | A1 | 3/2017 | Jayachandran et al. |
| 2017/0244748 | A1 | 8/2017 | Krause et al. |

OTHER PUBLICATIONS

Cziva, Richard et al. Container-based Network Function Virtualization for Software-Defined Networks. 2015 IEEE Symposium on Computers and Communication (ISCC). https://ieeexplore.ieee.org/stamp/stamp.jsp?tp=&arnumber=7405550 (Year: 2015).*

Linn, et al., "Protecting Against Unexpected System Calls", Department of Computer Science, University of Arizona, Tucson, AZ, 2005, url: https://www.usenix.org/legacy/events/sec05/tech/linn.html, pp. 239-254.

Kovatsch, et. al., "A RESTful Runtime Container for Scriptable Internet of Things Applications", 3rd IEEE International Conference on the Internet of Things, Oct. 2012.

Mattetti, et. al., "Securing the Infrastructure and the Workloads of Linux Containers", IEEE Conference on Communications and Network Security (CNS), 2015.

Pan, et. al., Robust Container Code Recognition System, Fifth World Congress on Intelligent Control and Automation, 2004.

Dhakchianandan, et al., "Memory Efficacious Pattern Matching Intrusion Detection System", 2013 International Conference on Recent Trends in Information Technology (ICRTIT), pp. 652-656, Anna University, Chennai, India.

Guenane, et al, "Autonomous Architecture for Managing Firewalling Cloud-Based Service," 2014 International Conference and Workshop on the Network of the Future (NOF), Paris, France, pp. 1-5.

Rehak, et al., "Adaptive Multiagent System for Network Traffic Monitoring," IEEE Intelligent Systems, vol. 24, Issue: 3, 2009, Czechia, pp. 17-25.

Shouman, et al., "Surviving Cyber Warfare With a Hybrid Multiagent-based Intrusion Prevention System," IEEE Potentials, vol. 29, Issue: 1, 2010, pp. 32-40.

Song, et al., "A Control Theoretical Approach for Flow Control to Mitigate Bandwidth Attacks," 2006 IEEE Information Assurance Workshop, West Point, NY, pp. 348-360.

Van Niekerk, et al., "Cloud-Based Security Mechanisms for Critical Information Infrastructure Protection," 2013 International Conference on Adaptive Science and Technology, South Africa, pp. 1-4.

Wang, et al., "Transport-Aware IP Routers: A Built-in Protection Mechanism to Counter DDoS Attacks," IEEE Transactions on Parallel and Distributed Systems, vol. 14, Issue: 9, pp. 873-884, Sep. 2003.

Cooper, et. al., "Internet X.509 Public Key Infrastructure Certificate and Certificate Revocation List (CRL) Profile", May 2008, pp. 151.

Housley, et. al., "Internet X 509 Public Key Infrastructure Certificate and Certificate Revocation List (CRL) Profile", Apr. 2002, pp. 259.

(56) References Cited

OTHER PUBLICATIONS

Schneier, Bruce., "Economics of Information Security and Privacy III", 2013, pp. 73-109.

Azkia, et al., "Reconciling IHE-ATNA Profile with a posteriori Contextual Access and Usage Control Policy in Healthcare Environment", 2010 Sixth International Conference on Information Assurance and Security, 2010 IEEE, pp. 197-203, Cesson, Sevigne, France.

Skillen, et al., "Mobiflage: Deniable Storage Encryption for Mobile Devices," IEEE Transaction on Dependable and Secure Computing, vol. 11, No. 3, May-Jun. 2014, 2013 IEEE, pp. 224-237, Canada.

\* cited by examiner

NETWORKING-BASED PROFILING OF CONTAINERS AND SECURITY ENFORCEMENT

CROSS-REFERENCE TO RELATED APPLICATIONS

This application is a continuation-in-part of U.S. patent application Ser. No. 15/397,230 filed on Jan. 3, 2017, now pending, which claims the benefit of U.S. Provisional Patent Application Nos. 62/274,420 filed on Jan. 4, 2016, and 62/274,798 filed on Jan. 5, 2016. The Ser. No. 15/397,230 application is also a continuation-in-part (CIP) of:
  a) U.S. patent application Ser. No. 15/278,700 filed on Sep. 28, 2016, now pending, which claims the benefit of U.S. Provisional Patent Application Nos. 62/235,644 filed on Oct. 1, 2015, and 62/235,641 filed on Oct. 1, 2015; and
  b) U.S. patent application Ser. No. 15/292,915 filed on Oct. 13, 2016, now pending, which claims the benefit of U.S. Provisional Patent Application No. 62/241,812 filed on Oct. 15, 2015.

The contents of the above-referenced applications are hereby incorporated by reference.

TECHNICAL FIELD

The present disclosure generally relates to containerized applications, and more specifically to ensuring security and compliance for containerized applications.

BACKGROUND

A software container is an instance of a user-space running an application within the operating system (OS) of a host device (e.g., a server). Software containers enable operating-system-level virtualization in which the OS kernel allows the existence of multiple isolated software containers.

A software container (or a container) provides an executable environment with a complete filesystem. The filesystem may contain code, runtime, system tools, system libraries, and so on. That is, execution of a software container can be the same regardless of the underlying infrastructure. A Docker is one popular existing platform for creating, migrating, managing, and deploying software containers.

A software container, unlike a virtual machine, does not require or include a separate operating system. Rather, the container relies on the kernel's functionality and uses hardware resources (CPU, memory, I/O, network, etc.) and separate namespaces to isolate the application's view of the operating system. A software container can access the OS kernel's virtualization features either directly or indirectly. For example, Linux kernel can be accessed directly using the libcontainer library or indirectly using the libvirt service.

As demonstrated in FIG. 1, a number of software containers (i.e., the app containers 110-1 through 110-$n$, hereinafter referred to individually as a container 110, merely for simplicity purposes) can access and share the same OS kernel 120. However, each container 110 can be constrained to only use a defined amount of hardware resources (e.g., CPU, memory, etc.) in the underlying hardware layer 130. Thus, using software containers, hardware resources can be isolated, services can be restricted, and processes can be provisioned to have an almost completely private view of the operating system with their own process ID space, file system structure, and network interfaces.

FIG. 2 illustrates a typical structure of a software container 200. The software container 200 includes a base image 210 and a container layer 220. The base image 210 includes one or more image layers 215-1 through 215-$q$ (hereinafter referred to individually as a layer 215 and collectively as layers 215, merely for simplicity purposes). The layers 215 are read-only layers that represent filesystem differences. That is, the layers 215 are stacked on top of each other to form a base for the container's 200 root filesystem. The layers 215 are read only, and each layer 215 is identified by a randomly generated identifier number of a checksum computed using a hash function. All layers 215 and the base image 210 are collectively referred to a "container image").

The base image 210 (and its layers 215) can be shared across different software containers. Thus, only the container layer 220 differentiates between one software container and another. The container layer 220 is a readable and writable layer where all data written to the software container 200 is saved in the container layer 220. When the software container 200 is deleted, the writable container layer 220 is also deleted, and the base image 210 remains unchanged. As such, the software container 200 and other software containers (not shown) can share access to the same base image 210, where each software container has its own data state. In the example demonstrated in FIG. 2, the software container 200 is a Docker container (e.g., compliant with the Docker platform).

The popularity of software containers has been increased due to the easy integration with cloud-computing platform (e.g., Amazon® Web Services, Google® Cloud Platform, Microsoft® Azure, etc.). On such platforms, service providers can offer operating systems to run services and applications. With that said, the increasing reliance on software containers increases the need for secured execution.

Container images are typically uploaded and stored in image registries that may or may not be managed by an organization. Further, the base images are used across many container images. As such, base images can be developed and uploaded to image registries by programmers who are associated with the organization seeking to use the image. Therefore, hackers can take advantage of program images to include malicious code. Thus, such images can be vulnerable when integrated in a software container. Such malicious code may carry any type of malware including, for example, computer viruses, worms, Trojan horses, ransomware, spyware, adware, scareware, and the like. Further, such malicious code may be a source for an ATP attack or a distributed denial of service (DDoS) attack when a software container is executed with an infected or malicious image.

To limit the risk associated with container images stored in registries, several security and/or auditing processes can be performed prior to uploading a container image in a register. However, such processes are very limited in the type of vulnerabilities that they can check. Further, a container image determined to be safe can be later modified by a hacker (or an innocent programmer) to include code that can harm the execution environment.

Typically, a software container (and, thus, each application) can be secured separately from other software containers (and applications) during runtime execution. Thus, one software container cannot access resources of other software containers. However, the isolation of software containers cannot prevent the execution of malicious code. Malicious activity by software containers can occur through exploitation of legitimate programs or services in a container and improper configuration. Improper configuration may result in, for example, privilege escalations. Detection of such vulnerabilities occurs only at runtime, i.e., during the execution of the software containers.

Existing security solutions are not designed to detect vulnerabilities in images of software containers. Specifically, images have a specific structure that cannot be processed by existing security solutions. Further, existing solutions cannot determine or predict how the container image (being a static file) would behave when it is being executed. For example, a conventional antivirus tool cannot scan container images to detect, for example, which listening ports should be used during operation.

It would therefore be therefore advantageous to provide a solution that would secure the execution of software containers.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for securing execution of software containers using security profiles. The method comprises receiving an event indicating that a container image requires profiling, wherein the container image includes resources utilized to execute a corresponding application container; generating a security profile for the container image when the event is received, wherein the generated security profile indicates at least networking ports that are allowed for at least one of: access to the application container, and access by the application container; monitoring an operation of a runtime execution of the application container; and detecting a violation of the security profile based on the monitored operation.

Certain embodiments disclosed herein also include a non-transitory computer readable medium having stored thereon causing a processing circuitry to execute a process, the process comprising: receiving an event indicating that a container image requires profiling, wherein the container image includes resources utilized to execute a corresponding application container; generating a security profile for the container image when the event is received, wherein the generated security profile indicates at least networking ports that are allowed for at least one of: access to the application container, and access by the application container; monitoring an operation of a runtime execution of the application container; and detecting a violation of the security profile based on the monitored operation.

Some embodiments disclosed herein also include a host device for securing execution of software containers using security profiles. The host device comprises a processing circuitry; and a memory, the memory containing instructions that, when executed by the processing circuitry, configure the host device to: receive an event indicating that a container image requires profiling, wherein the container image includes resources utilized to execute a corresponding application container; generate a security profile for the container image when the event is received, wherein the generated security profile indicates at least networking ports that are allowed for at least one of: access to the application container, and access by the application container; monitor an operation of a runtime execution of the application container; and detect a violation of the security profile based on the monitored operation.

Some embodiments disclosed herein also include a method for creating a security profile based on networking attributes of a software container. The method comprises receiving an event indicating that a container image requires profiling, wherein the container image includes resources utilized to execute a corresponding application container; generating a security profile for the container image when the event is received, wherein the generated security profile indicates at least networking ports that are allowed for at least one of: access to the application container, and access by the application container.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
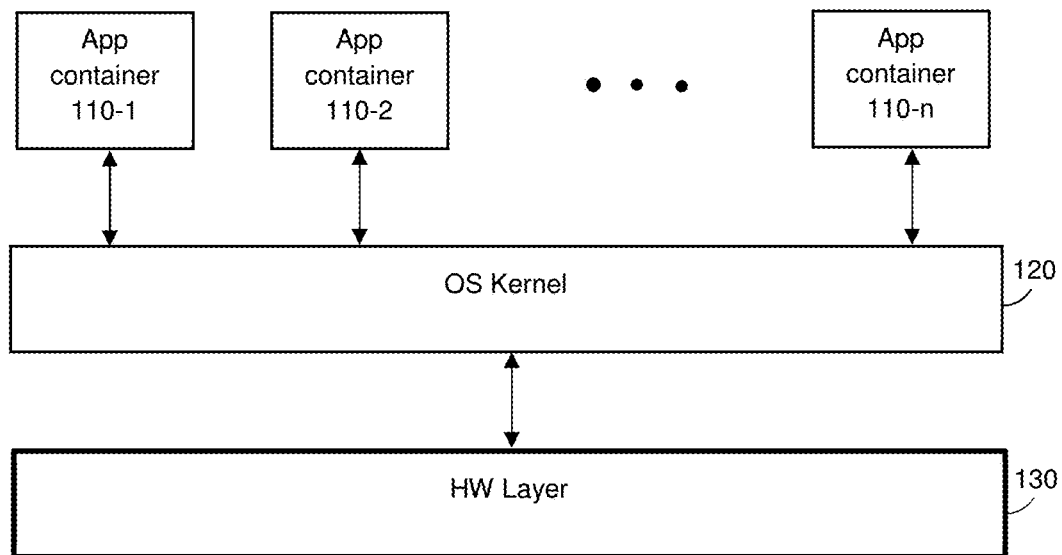
FIG. 1 is a diagram illustrating of execution of a plurality of software containers.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, the various disclosed embodiments include a method and system for profiling and securing execution of software containers using security profiles. A security profile is created for a software container based on networking ports ("ports") that are allowed to be used by the software container. The security profile indicates the allowed ports for the container. To this end, the security profile may include a list (whitelist) of allowed ports.

In an embodiment, the security profile is created based on static analysis of all layers in a container image prior to runtime of a container. To this end, an application to be executed by the container, a configuration for the application, one or more environmental variables, or a combination thereof, are analyzed to determine ports to be used by the container at runtime. A container image is a static file and a runtime instance of the container image is an APP container.

In another embodiment, the security profile is created based on behavioral analysis of the APP container at runtime. During a learning phase, ports that are opened by the APP container are learned. It is determined whether each opened port is a valid port for one or more processes utilized by the APP container, for example as indicated in a runtime model of each process. The opened ports that are determined as valid are included in the security profile as allowed ports. In yet another embodiment, both static analysis and runtime learning may be utilized to create the security profile for an APP container, for example by including ports identified both via static analysis and via runtime analysis in a security profile whitelist.

The execution of the APP container is monitored to enforce the security profile. The enforcement includes detection of any breach of the security profile based on a security policy, and may further include performing one or more mitigation actions. The various embodiments will be discussed in greater detail below.

Figure 3:
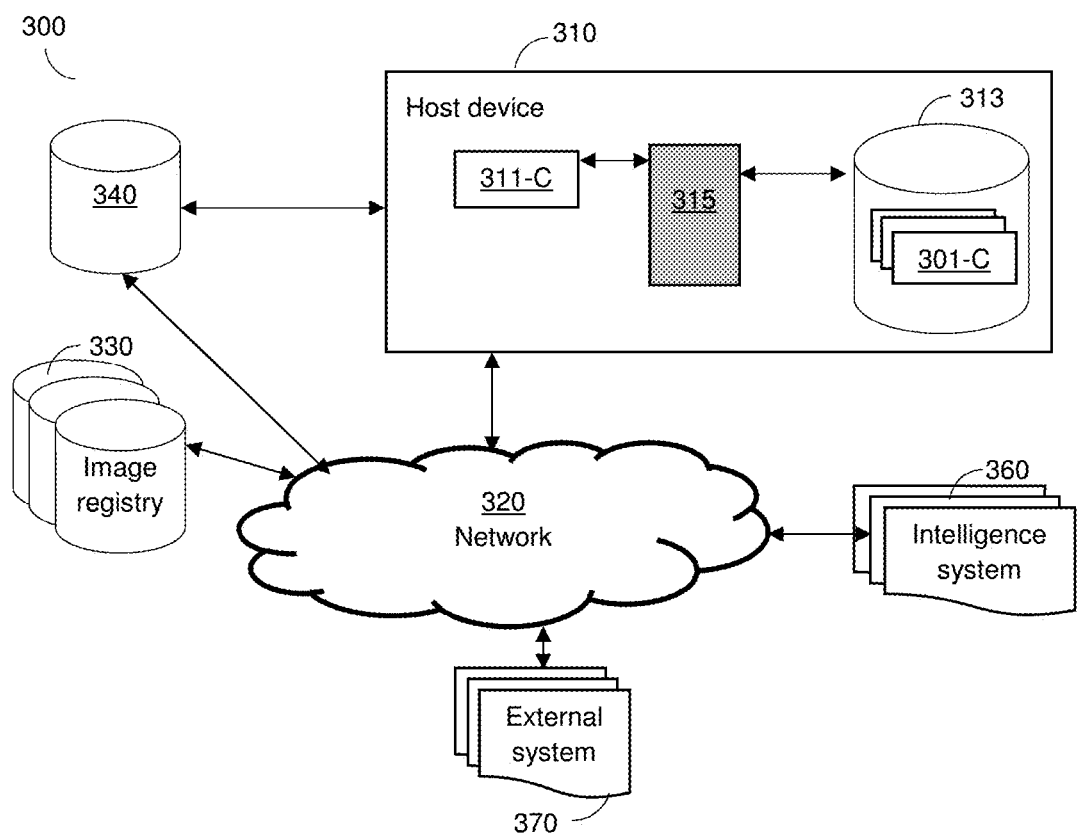
FIG. 3 is a network diagram utilized to describe the various disclosed embodiments.

FIG. 3 is an example network diagram 300 utilized to describe the various disclosed embodiments. A host device 310 is communicatively connected to a network 320. The host device 310 can be realized as a physical machine, a virtual machine, or a cloud infrastructure (IaaS). Examples for such a cloud infrastructure include, but are not limited to, Amazon Web Services (AWS), Cisco® Metapod, Microsoft Azure®, Google® Compute Engine (GCE), Joyent®, and the like. The host device 310 may be deployed in a datacenter, a cloud computing platform (e.g., a public cloud, a private cloud, or a hybrid cloud), on-premises of an organization, or in a combination thereof. The network 320 may be the Internet, the world-wide-web (WWW), a local area network (LAN), a wide area network (WAN), a metro area network (MAN), and other networks.

Figure 2:
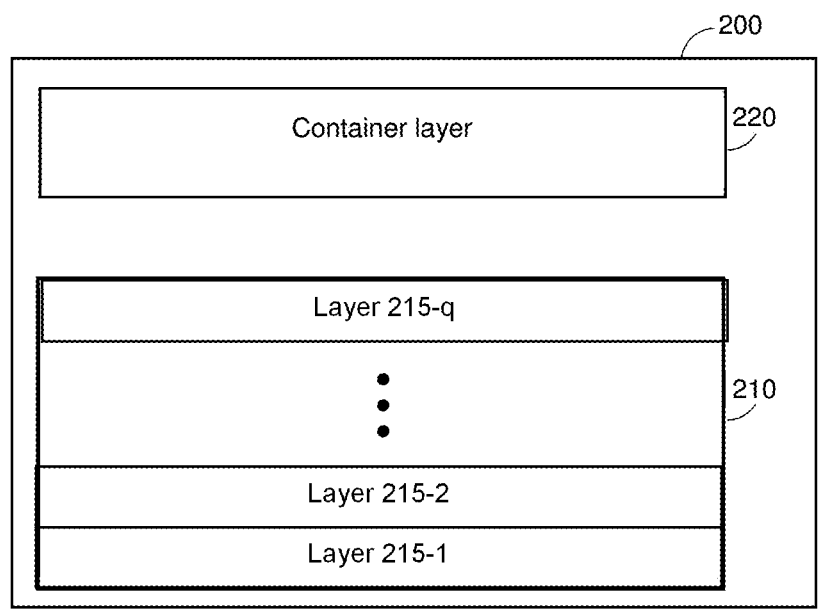
FIG. 2 is a diagram illustrating a structure of a software container.

Also connected to the network 320 is one or more image registries 330 (collectively referred to hereinafter as image registries 330 and individually as an image registry 330, merely for simplicity purposes). Each image registry 330 stores container images (not shown) that can be imported and executed on the host device 310. An example container image is shown in FIG. 2.

An image registry 330 may be, but is not limited to, Docker Hub, Google Container Registry, Amazon EC2 Container Registry, Artifactory, and the like. The image registry 330 is a data repository that allows programming and testing of container images. An image registry 330 typically provides a centralized resource for discovery, distribution, management, and collaboration of base images. An image registry 330 may be a cloud-based registry service or may be on-premises. In certain configurations, container images can be locally stored at the host device 310, e.g., in a registry 313.

According to the disclosed embodiments, the host device 310 is configured to host and execute a detector container 315. The detector container 315 is a software container designed to profile container images stored in the registries 330 and to enforce a secured execution of a respective APP container based on security profiles. For example, a registry 313 includes a container image 301-C, where the runtime instance of this image is an APP container 311-C.

In an embodiment, the host device 310 (and the detector container 315) are configured to interface with a continuous integration (CI) system (not shown). Typically, a CI system allows for building, testing, and uploading of container images to the image registries 330. Examples for such a CI system include Jenkins®, Appveyor®, TeamCity, Bamboo, and the like. In an example embodiment, the interface between the host device 310 and the system may be realized as an API or a plugin. The host device 310 may also be communicatively connected to a database 340 storing generated security profiles, polices, and data utilized to profile the container images.

In an optional deployment, the host device 310 is communicatively connected to one or more intelligence systems 360 through the network 320. The intelligence systems 360 may include common vulnerabilities and exposures (CVE®) databases, reputation services, security systems (providing feeds on discovered threats), and so on. The information provided by the intelligence systems 360 is utilized to detect certain vulnerabilities, to profile the container images, or both.

The host device 310 may be communicatively connected to one or more external systems 370 through the network 320. Examples for such external systems 370 may include, but are not limited to, an active directory of an organization to retrieve user permissions, access control systems (e.g., Docker Swarm, and Kubernetes management plane), SIEM systems to report on detected vulnerabilities, audit and compliance systems, and the like.

According to the disclosed embodiments, the detector container 315 is configured to receive an event indicating that a container image in one of the image registries 330 has been changed or added. The event includes at least a source of the image (e.g., a registry's network address or a check-in system) and an identifier of the container image to be checked. In some embodiments, the event may be generated by the host device 310 when a new base image is uploaded to the host or when an image locally stored in the host device 310 is modified. As discussed above, the container image includes a container layer (e.g., the layer 210, FIG. 2) which sets the application executed by a container and a plurality of image layers (e.g., the layers 215, FIG. 2), each of which is uniquely identified. Each container image may be assigned a unique identifier, which may be computed as a check-sum or hash value computed over the contents of the layer.

In an embodiment, upon receiving an event, the respective container image is downloaded to the host device 310 (e.g. a container image 301-C) and a security profile is generated for the container image. A security profile is generated through static analysis of the various layers, that is, without execution of the container image 301-C. The profiling process will be discussed with reference to the container image 301-C. In an optional embodiment, the container image 301-C is reformatted into a data structure that can be processed. For example, the container image 301-C may be reformatted to be, but is not limited to, a file having a standard format, a TAR (Tape ARchive) file, and the like.

According to the disclosed embodiments, the detector container 315 is configured to analyze the container image 301-C to identify programs written in any scripting language (e.g., Python, Ruby, JavaScript, etc.) or programming language (e.g., C, C+, Java, etc.). For each identified program (or a piece of code), the detector container 315 is configured to identify resources to be utilized and, more specifically, networking ports used by processes of the container.

In an embodiment, a generated security profile includes networking ports that are allowed to be used by the container image 301-C. Specifically, the security profile may indicate the ports that are allowed to be accessed by the container image 301-C and the ports through which the container image 301-C may be accessed, for example as defined in network actions for the container image 301-C. To this end, the security profile may include, but is not limited to, a whitelist of allowed ports. The security profile may further indicate allowed ports for accessing and for being accessed.

To this end, the detector container 315 may be configured to profile the network actions (activities) permissible by the container image 301-C. The permissible network actions are determined based on the context of the application executing the APP container 311-C. Each such action defines which network resources can be accessed by the APP container 311-C during runtime and which network resources can access the APP container during runtime. The network resources include at least networking ports.

In an embodiment, the network resources are determined based on types of programs accessing or accessed by known applications matching the application of the APP container 311-C. Example programs that may access or be accessed by an application of the APP container 311-C may include, but are not limited to, MongoDB, Apache, MySQL, CMDLine, and the like. Each program may have one or more known ports that are to be used for that program. As a non-limiting example, the program MongoDB may be configured to communicate with the APP container 311-C via port 27017.

Alternatively or collectively, the network resources that can access or be accessed by the APP container 311-C are determined based on an analysis of the network configuration files for the container image 301-C. The configuration files may be, for example, added to the respective APP container 311-C via filesystem mounts prior to execution of the APP container 311-C. To this end, the detector container 315 may be configured to scan filesystem mounts attached to the APP container 311-C at runtime.

The network configuration files may include changes to default ports or other modifications that affect which ports are utilized. As a non-limiting example, for an application configured to access MongoDB, the default port may be port number 27017, but the port indicated in the configuration file may be changed to port number 12345 in the configuration file. As another non-limiting example, for an application configured to access MongoDB, the default port may be port number 27018 when running with the "—shardsvr"runtime operation or when the configuration file includes "shardsvf" as the value for the clusterRole setting, while the default port may be port number 27019 when running with the "—configsvr" runtime operation or when the configuration file includes "configsvf" as the value for the clusterRole setting.

In another embodiment, the network resources are determined based on the analysis of processes to be executed by the APP container 311-C of the respective container image 301-C. For example, if a process "myCode" includes an instruction to open a port number 443, the security profile of the container image 301-C would designate port number 443 as an allowed port.

In an embodiment, the generated security profile may further include access settings for programs that the APP container 311-C is configured to access or be accessed by. The access settings may include, but are not limited to, transport layer security (TLS) settings, expected protocol formats, exposure settings with respect to the orchestration infrastructure of the hardware layer, and the like.

In an embodiment, prior to generating a new security profile for a container image 311, it is checked, using its identifier, if a security policy was already generated for that container image. If so, the profiling process includes updating the contents of the existing security profile.

As noted above, in an embodiment, the generation and updating of a security profile may be performed as an offline process, that is, prior to executing the respective APP container. In another embodiment, generation or updating of a security profile can be performed as an online process, that is, at runtime during a predefined learning period (e.g., 1 hour after a first launch of the container). During the learning period, the detector container 315 is configured to monitor the operation of the container image 311-C to detect any uses of ports (e.g., via network actions). The monitored operations during the learning period are considered safe and added to the profile.

In an embodiment, the detector container 315 is configured to enforce the security profiles based on a security policy. The security policy may define the mitigation action to be performed upon detection of a breach, the severity of each breach, whether or not a security profile should be completed in order to enforce or launch a container, a combination thereof, and the like. A security policy may be defined individually for each container image or for a group of container images.

In an embodiment, enforcement of a security policy generated for a container is executed in the host 310. For example, execution of the APP container 311-C from the container image 301-C. To this end, the detector container 315 is configured to monitor events (or system calls) indicative of instantiation, running, or both, of a new APP container (e.g., the container 311-C). The execution of an APP container 311-C is monitored at least by scanning ports to detect opening of ports.

Specifically, any ports that are utilized to access or be accessed by programs during the runtime of the APP container 311-C are identified and compared against the allowed ports as defined in the security profile. For example, an attempt to access a directory through a port that is not whitelisted for access by the APP container 311-C would be considered as a violation of the security profile. As another example, an attempt to access the application executed by the APP container 311-C through a port that is not whitelisted for allowing access to the APP container 311-C would be considered as a violation of the security profile.

In an embodiment, the security profile may define allowed networking ports (ports) per program accessing or being accessed by the APP container 311-C. For example, the program MongoDB may be configured to use only port 27017 such that a violation of the security profile may be determined when the program MongoDB uses any other port. In a further embodiment, it may be checked whether each program accessing or being accessed by the APP container 311-C is using a port designated for another program. Continuing the example above, if another program uses the port 27017 when that port is designated for use by MongoDB, a violation may be determined.

In some implementations, the monitoring may also include identifying TLS settings used by programs communicating with the APP container 311-C, protocol formats used by such programs, where ports are accessed from (e.g., internally via the orchestration layer as opposed to via the Internet), a combination thereof, and the like, to check for compliance with the security profile. For example, if a program is configured to run with mutual TLS, it may be checked whether it is listening without mutual TLS. As another non-limiting example, if the program is MongoDB, it is checked whether responses from the program are in MongoDB protocol format. As yet another non-limiting example, if the program listens on internal ports that are not exposed by the orchestration infrastructure, it may be checked whether the ports are accessed from the Internet.

Upon detecting a violation of the security profile, an enforcement (or mitigation) action may be performed. In an embodiment, the enforcement action to be taken is defined in the security profile. An enforcement action may include generating an alert, halting the operation of the APP container, halting or disabling the execution of a process, quarantining the APP container, and so on.

The enforcement actions may be defined with respect to different parameters, fields, or both, in the security profile. For example, any violation of a permissible network action would be reported, but a violation of a permissible network action would halt the APP container's execution. A security policy may be defined by a user (e.g., a system administrator) based on the application context of an APP container, the deployment environment, and so on.

In an embodiment, execution of an APP container (e.g., the APP container 311-C) may be performed in a quarantined environment, thereby protecting the host device 310. This embodiment is further discussed in the U.S. patent application Ser. No. 15/278,700, assigned to the common assignee, the contents of which are hereby incorporated by reference.

Figure 4:
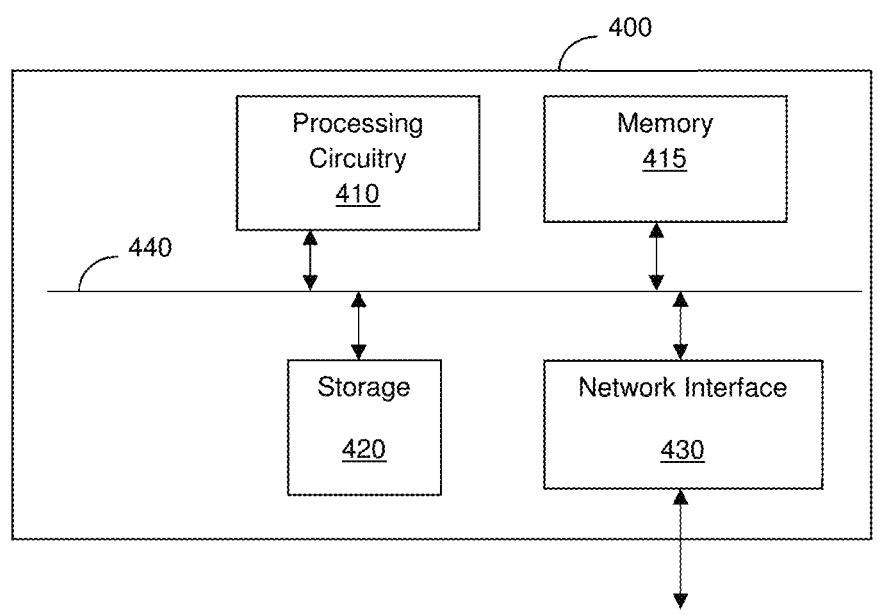
FIG. 4 is a block diagram of a hardware layer in host devices utilized to execute at least a detector container according to an embodiment.

It should be appreciated that the host device requires an underlying hardware layer to execute the OS, VMs, and software (APP) containers. An example block diagram of a hardware layer 400 is shown in FIG. 4. The hardware layer 400 includes a processing circuitry 410, a memory 415, a storage 420, and a network interface 430, all connected to a computer bus 440.

The processing circuitry 410 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory may be volatile, non-volatile, or a combination thereof. The storage may be magnetic storage, optical storage, and the like.

In one configuration, computer readable instructions to implement one or more of the embodiments disclosed herein may be stored in the storage. The storage may also store other computer readable instructions to implement an operating system, an application program, and the like. Computer readable instructions may be loaded in the memory for execution by the processing circuitry 410.

In another embodiment, the storage 420, the memory 415, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing system 410, cause the processing system 510 to perform the various functions described herein with respect to at least profiling container images and enforcing secured execution of their respective APP containers based on the profiles.

The network interface 430 allows communication with other external systems or host devices through a network (e.g., the network 320). The network interface 430 may include a wired connection or a wireless connection. The network interface 430 may transmit communication media, receive communication media, or both. The computer bus 440 may be, for example, a PCIe bus.

Figure 5:
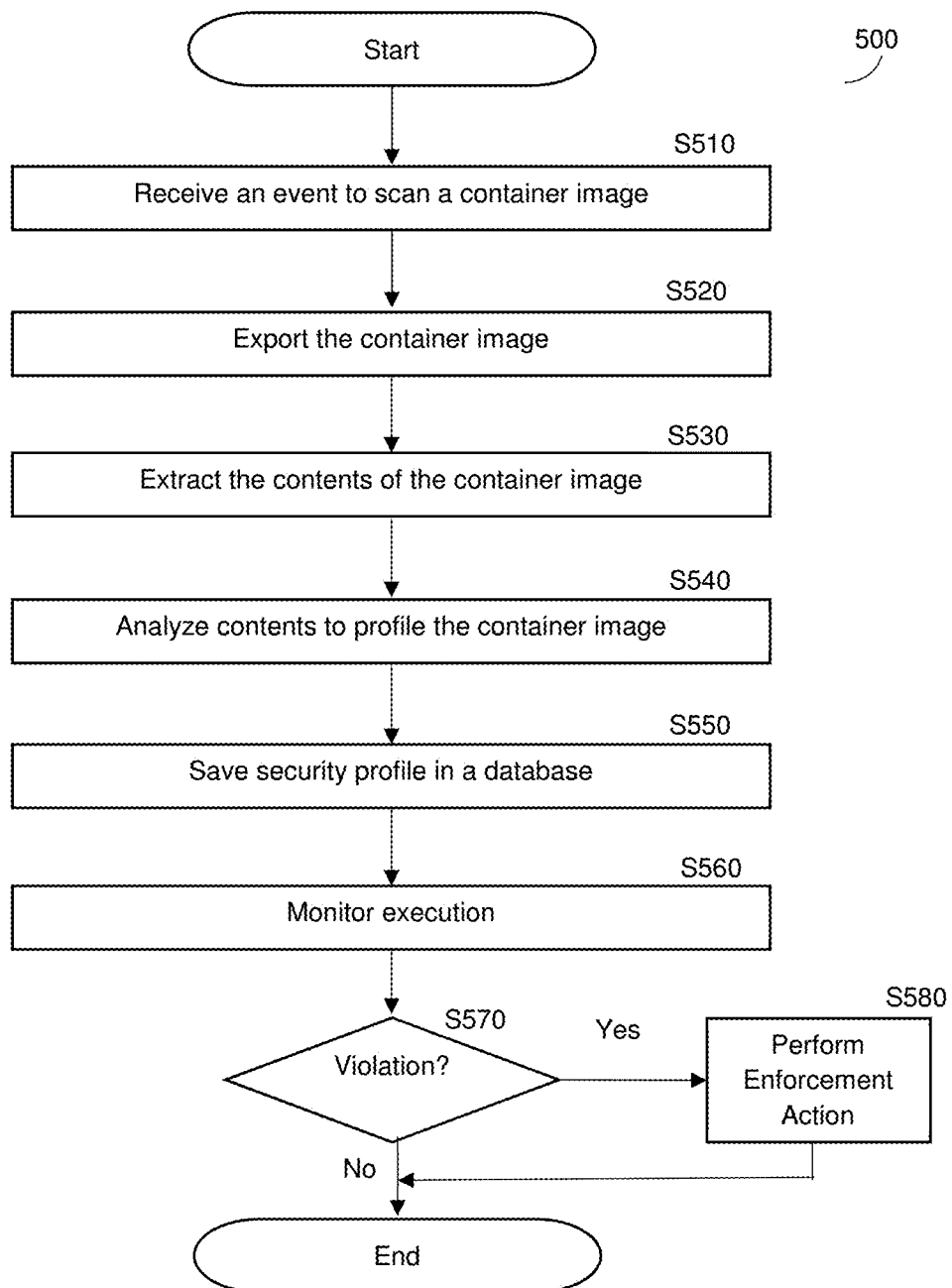
FIG. 5 is a flowchart illustrating a method for static profiling and securing execution of a container according to an embodiment.

FIG. 5 shows an example flowchart 500 illustrating a method for profiling container images and enforcing secured execution of the respective APP containers according to an embodiment. In an embodiment, the method is performed by the detector container 315.

At S510, an event indicating that a container image should be scanned is received. Such an event can be received from a continuous integration system, an image registry, and the like. The event may designate a specific container image or a group of images (each of which identified by their unique identifier) and the source of the image(s) to be scanned. For sake of simplicity of the discussion, the example flowchart 500 is discussed with respect to receiving a single event of single container image and enforcing a single corresponding APP container. It should be noted that additional events may be received without departing from the scope of the disclosure. Further, multiple container images and APP containers can be processed in parallel.

At S520, the container image (e.g., the container image 301-C, FIG. 3) to be scanned is exported from its source to the device hosting the detector container. It should be emphasized that exporting the container image does not require executing the image on the host device.

At optional S530, the contents of the container image are extracted. Specifically, the contents of each layer in the container image may be extracted. In an embodiment, the extraction includes reformatting the container image into a data structure that can be processed.

At S540, the contents of the container image are analyzed to generate a new security profile. In some implementations, S540 may include updating an existing security profile. As discussed above, the security profile is generated to include at least a whitelist of allowed ports. The security profile may further indicate which ports are allowed to access or be accessed by the container image, or both. Static profiling of a container image is discussed above and further demonstrated in FIG. 6.

At S550, the new or updated security profile is saved in a database, indexed based on the respective container image identifier. The profiling of a container image is typically performed prior to runtime. As noted above, a generated security profile can also be updated at runtime during a predefined learning period, for example, by re-analyzing the container contents, or by monitoring port usage during a learning phase as described herein below with respect to FIG. 7.

At S560, the method transitions to an enforcement mode, upon receiving an event indicative of instantiation, running, or both, of a new APP container. An APP container (e.g., the APP container 311-C. FIG. 3) is a runtime instance of a corresponding container image (e.g., the container image 301-C, FIG. 3). In an embodiment, S560 includes retrieving the respective security profile; scanning ports of the hardware layer to identify ports opened by the APP container; and analyzing the identified ports to detect an attempt by the APP container to violate any parameter sets in the retrieved security profile. The analysis may include comparing any opened ports to the parameters defined the security profile and, specifically, comparing the identified opened ports with the whitelisted ports.

At S570, it is checked if the retrieved security profile has been violated and, if so, execution continues with S580, where an enforcement action is performed. Otherwise, execution terminates.

As discussed above, the enforcement action may be determined based on a security policy, the type of the detected violation, or both. The endorsement action may include, for example, generating an alert (or security event), halting the operation of the APP container, quarantining the APP container or the infected file, and so on. The alert may include an APP container identifier, a name of the infected process, information of the detected violation, and so on. The enforcement of the security policy is performed at runtime.

Figure 6:
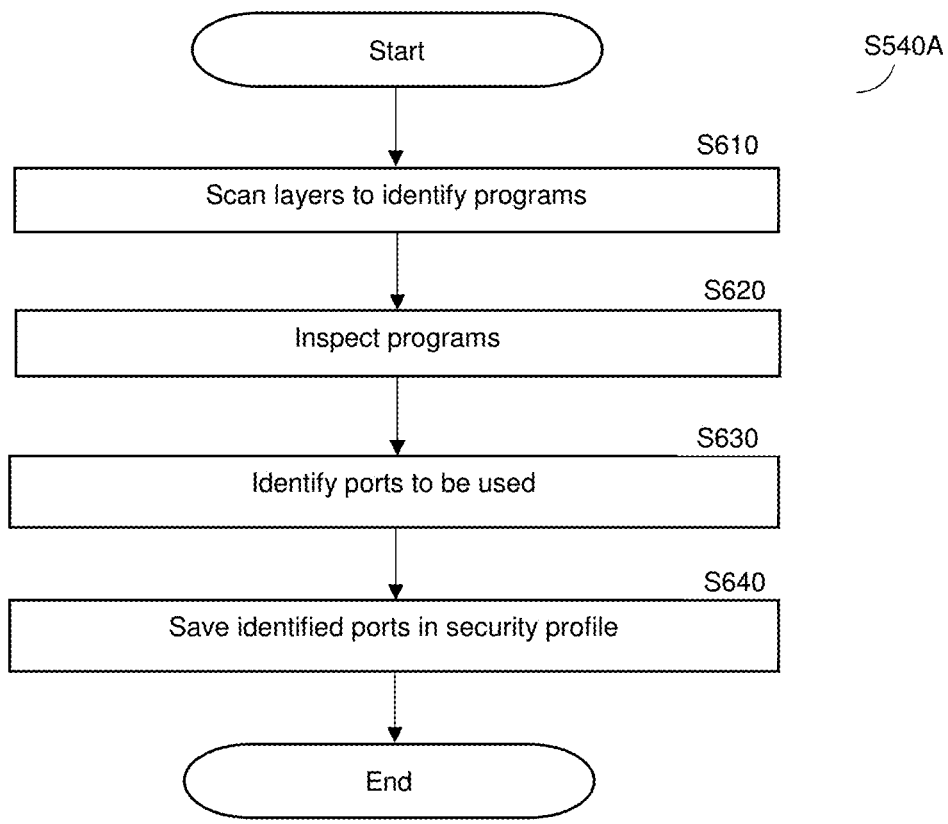
FIG. 6 is a flowchart illustrating a method for container image profiling according to an embodiment.

FIG. 6 shows an example flowchart S540 illustrating static network-based profiling according to an embodiment. At S610, the contents of the container image (received at S520) are scanned to identify programs (or pieces of code). The program can be coded in any programming language, scripting language, or combination thereof. The scan may be performed across all layers of the container image.

At S620, each identified program is inspected. The may include determining an application to be executed by the container, a configuration for the application, one or more environmental variables, or a combination thereof.

At S630, ports to be utilized by the container image are identified based on the inspection. In an embodiment, S630 may include determining network resources to be utilized by the container based on the determined application, configuration, environmental variables, or combination thereof. The network resources include ports used for communicating with the determined network resources. In a further embodiment, different ports may be determined for access by or to the container image.

At S640, the identified ports are saved in the security profile. The identified ports may be included in, for example, a whitelist stored in the security profile. The identified ports may be saved with an indication of whether each port is allowed for accessing, being accessed, or both.

Figure 7:
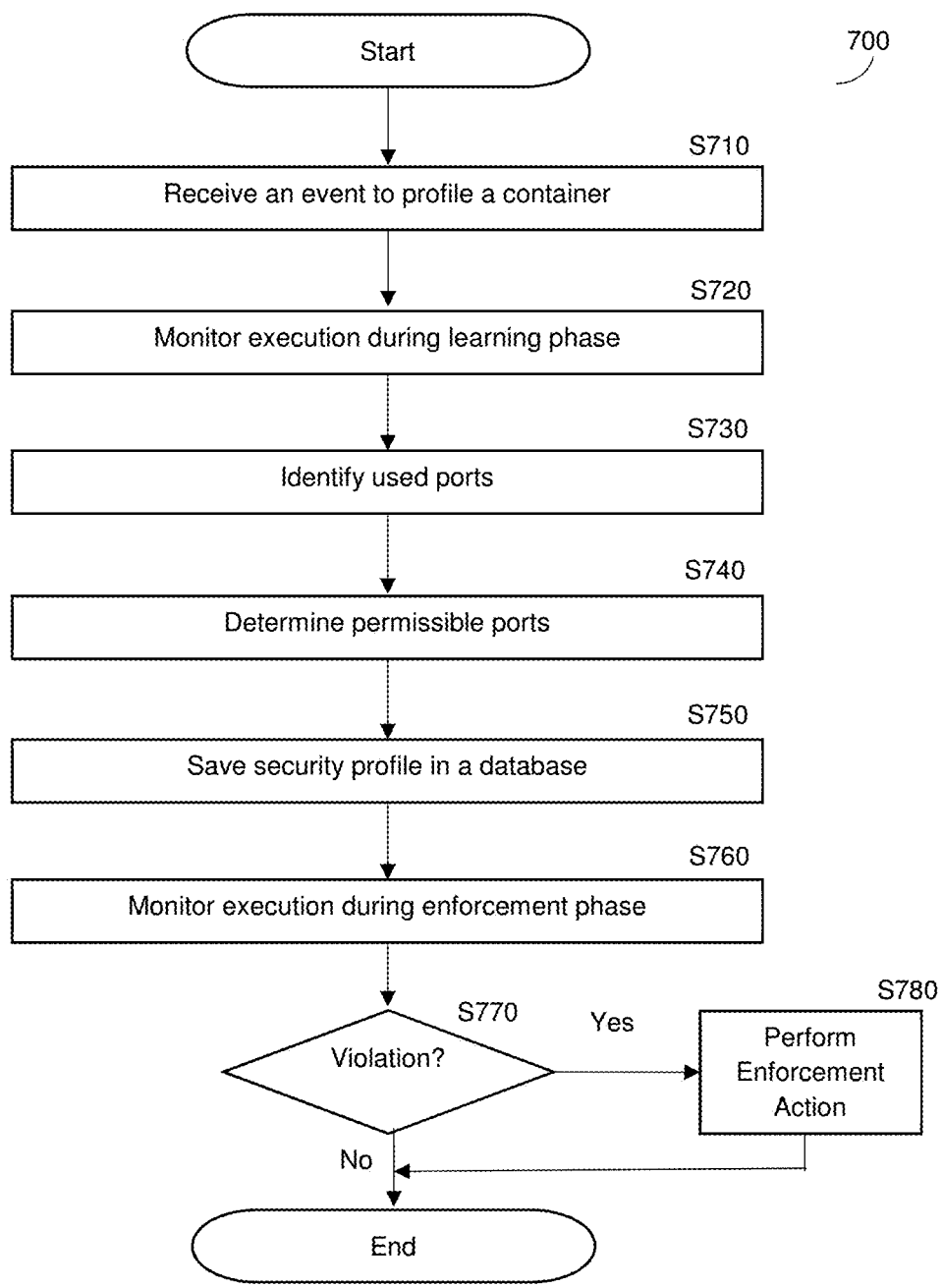
FIG. 7 is a flowchart illustrating a method for runtime profiling and securing execution of a container according to an embodiment.

FIG. 7 is an example flowchart 700 illustrating a method for profiling container images and enforcing secured execution of the respective APP containers according to another embodiment. In the embodiment described with respect to FIG. 7, the profiling is performed at runtime. In an embodiment, the method is performed by the detector container 315.

At S710, an event indicating that an APP container should be profiled is received. Such an event can be received from a continuous integration system, an image registry, and the like. The event may designate each APP container of a specific container image or group of container images.

At S720, during a learning phase, execution of the APP container is monitored. In an embodiment, S720 includes scanning ports of the hardware layer to identify ports opened by the APP container. The learning phase occurs during a startup period after initialization of the APP container, and may be a predetermined period of time (e.g., 10 minutes).

At S730, based on the learning phase monitoring, all ports used by the APP container during the learning phase are identified. In a further embodiment, S730 may also include determining whether the APP container accessed or was accessed with each port use.

At optional S740, allowed ports are determined based on the identified ports. In an embodiment, the allowed ports are defined with respect to processes, with each allowed port for a process being a port that is considered valid by a runtime model for the process. To this end, S740 may include determining processes of the APP container and ports considered valid by each process. The determining of processes and valid ports may be based on analysis of a container image, for example as described herein above with respect to FIG. 5.

At S750, a new or updated security profile is saved in a database, indexed based on the respective container image identifier. In the embodiment described with respect to FIG. 7, the profiling of a container image is typically performed during a learning phase after initialization of the APP container. A generated security profile may also be updated at runtime during a subsequent learning period.

At S760, the method transitions to an enforcement mode upon completion of the learning mode. In an embodiment, S760 includes retrieving the respective security profile; scanning ports in the hardware layer to identify ports opened by the APP container; and analyzing the identified ports to detect violations of any parameter sets in the retrieved security profile. The analysis may include comparing any intercepted communication to the parameters defined in the security profile and, specifically, comparing the identified ports with the whitelisted ports.

At S770, it is checked if the retrieved security profile has been violated and, if so, execution continues with S780. where an enforcement action is performed. Otherwise, execution terminates.

As discussed above, the enforcement action may be determined based on a security policy, the type of the detected violation, or both. The endorsement action may include, for example, generating an alert (or security event), halting the operation of the APP container, quarantining the APP container or the infected file, and so on. The alert may include an APP container identifier, a name of the infected process, information of the detected violation, and so on. The enforcement of the security policy is performed at runtime.

It should be noted that FIGS. 5 and 7 are described as separate profiling processes merely for simplicity purposes, and that the static and runtime profiling techniques described herein may be integrated without departing from the scope of the disclosure. For example, a whitelist may be created based on both static analysis of container contents and runtime analysis of container behavior.

It should be noted that various embodiments have been discussed herein with a reference to software containers. A software container provides an executable environment with a complete filesystem. A software container may include a micro-service, a Docker container, a light virtual machine, a serverless process, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for securing execution of software containers using security profiles, comprising:
   receiving an event indicating that a container image requires profiling, wherein the container image includes resources utilized to execute a corresponding application container;
   generating a security profile for the container image when the event is received, wherein the generated security profile indicates at least networking ports that are allowed for at least one of: access to the application container, and access by the application container;
   monitoring an operation of a runtime execution of the application container; and
   detecting a violation of the security profile based on the monitored operation.

2. The method of claim 1, further comprising:
   exporting the container image to a host device from the image registry; and
   generating the security profile for the container image in the host device without executing the container image on the host device.

3. The method of claim 1, wherein generating the security profile further comprises:
   scanning contents of the container image to identify programs; and
   determining networking ports utilized by each identified program.

4. The method of claim 1, wherein generating the security profile further comprises:
   monitoring, during a learning phase, the operation of the runtime execution of the application container, wherein the generated security profile includes at least one networking port opened by the application container during the learning phase.

5. The method of claim 4, wherein a hardware layer includes the container image and a plurality of ports, wherein monitoring the operation of the runtime execution of the application container further comprises:
   scanning the plurality of networking ports of the hardware layer to identify each port opened by the application container at runtime.

6. The method of claim 4, wherein the learning phase is a predetermined period of time after the beginning of the runtime execution of the application container.

7. The method of claim 4, wherein generating the security profile further comprises:
   determining whether each of the at least one port opened by the application container during the learning phase is a valid port for a runtime model of at least one process utilized by the application container.

8. The method of claim 1, wherein the application container is configured to communicate with at least one program at runtime, wherein the security profile further indicates at least one of: one of the at least one program for which each networking port is to be used, transport layer security settings for each program, an expected protocol format for each program, and whether each program accesses an internal port.

9. The method of claim 1, further comprising:
   performing at least one enforcement action when a violation is detected, wherein the at least one enforcement action includes at least one of: generating an alert, halting the operation of the application container, and quarantining the application container.

10. A non-transitory computer readable medium having stored thereon instructions for causing a processing circuitry to execute the method according to claim 1.

11. A system for securing execution of software containers using security profiles, comprising:
    a processing circuitry; and
    a memory, the memory containing instructions that, when executed by the processing circuitry, configure the system to:
    receive an event indicating that a container image requires profiling, wherein the container image includes resources utilized to execute a corresponding application container;
    generate a security profile for the container image when the event is received, wherein the generated security profile indicates at least networking ports that are allowed for at least one of: access to the application container, and access by the application container;
    monitor an operation of a runtime execution of the application container; and
    detect a violation of the security profile based on the monitored operation.

12. The system of claim 11, wherein the system is further configured to:
    export the container image to a host device from the image registry; and
    generate the security profile for the container image in the host device without executing the container image on the host device.

13. The system of claim 11, wherein the system is further configured to:
   scan contents of the container image to identify programs; and
   determine networking ports utilized by each identified program.

14. The system of claim 11, wherein the system is further configured to:
   monitor, during a learning phase, the operation of the runtime execution of the application container, wherein the generated security profile includes at least one networking port opened by the application container during the learning phase.

15. The system of claim 14, wherein a hardware layer includes the container image and a plurality of ports, wherein the system is further configured to:
   scan the plurality of networking ports of the hardware layer to identify each port opened by the application container at runtime.

16. The system of claim 14, wherein the learning phase is a predetermined period of time after the beginning of the runtime execution of the application container.

17. The system of claim 14, wherein the system is further configured to:
   determine whether each of the at least one port opened by the application container during the learning phase is a valid port for a runtime model of at least one process utilized by the application container.

18. The system of claim 11, wherein the application container is configured to communicate with at least one program at runtime, wherein the security profile further indicates at least one of: one of the at least one program for which each networking port is to be used, transport layer security settings for each program, an expected protocol format for each program, and whether each program accesses an internal port.

19. The system of claim 11, wherein the system is further configured to:
   perform at least one enforcement action when a violation is detected, wherein the at least one enforcement action includes at least one of: generating an alert, halting the operation of the application container, and quarantining the application container.

20. A method for creating a security profile based on networking attributes of a software container, comprising:
   receiving an event indicating that a container image requires profiling, wherein the container image includes resources utilized to execute a corresponding application container; and
   generating a security profile for the container image when the event is received, wherein the generated security profile indicates at least networking ports that are allowed for at least one of: access to the application container, and access by the application container.

* * * * *

UNITED STATES PATENT AND TRADEMARK OFFICE
CERTIFICATE OF CORRECTION

PATENT NO. : 10,599,833 B2
APPLICATION NO. : 15/858336
DATED : March 24, 2020
INVENTOR(S) : Liron Levin, Dima Stopel and Eran Yanay Page 1 of 1

It is certified that error appears in the above-identified patent and that said Letters Patent is hereby corrected as shown below:

On the Title Page

Related U.S. Application Data

Item (63) should read:
"Continuation-in-part of application No. 15/397,230, filed on January 3, 2017, which is a continuation-in-part of application No. 15/278,700, filed on September 28, 2016, and a continuation-in-part of application No. 15/292,915, filed on October 13, 2016, now Patent No. 10,223,534."

Item (60) should read:
"Provisional application No. 62/274,420, filed on January 4, 2016, Provisional application No. 62/274,798, filed on January 5, 2016, provisional application No. 62/235,644, filed on October 1, 2015, provisional application No. 62/235,641, filed on October 1, 2015, provisional application No. 62/241,812, filed on October 15, 2015."

Signed and Sealed this
Twenty-ninth Day of September, 2020

Andrei Iancu
*Director of the United States Patent and Trademark Office*